United States Patent [19]

Waku et al.

[11] Patent Number: 4,879,074
[45] Date of Patent: Nov. 7, 1989

[54] METHOD FOR COATING SOOT ON A MELT CONTACT SURFACE

[75] Inventors: Yoshiharu Waku; Hideho Yoshioka; Hiroyoshi Oba; Kiyoshi Fujino, all of Ube, Japan

[73] Assignee: Ube Industries, Ltd., Yamaguchi, Japan

[21] Appl. No.: 123,261

[22] Filed: Nov. 20, 1987

[30] Foreign Application Priority Data

Nov. 27, 1986 [JP] Japan .................................. 61-280708
Mar. 13, 1987 [JP] Japan .................................. 62-56799

[51] Int. Cl.⁴ ............................ B28B 7/38; B05D 1/06
[52] U.S. Cl. .................... 264/24; 264/338; 427/27; 427/28; 427/133
[58] Field of Search ............... 427/135, 237, 28, 27, 427/223, 249, 133; 264/24, 338

[56] References Cited

U.S. PATENT DOCUMENTS 2,788,296 4/1957 Louis ............................. 427/249 X
3,165,567 1/1965 Olson ............................. 264/338 X
3,892,827 7/1975 Keller et al. .................. 264/338 X
4,748,796 6/1988 Viel ............................... 427/28 X

FOREIGN PATENT DOCUMENTS 60-20113 5/1985 Japan .
61-99551 5/1986 Japan .

Primary Examiner—Evan Lawrence
Attorney, Agent, or Firm—Finnegan, Henderson, Farabow, Garrett & Dunner

[57] ABSTRACT

A method of coating on a melt contact surface such as that of an injection sleeve for casting, a plunger end face or a mold cavity comprises a step of charging the soot and the melt contact surface with opposite electrical polarities to thereby cause an electrodeposition of the charged soot on the melt contact surface. A preferred apparatus for the soot coating comprises means for producing an air stream surrounding a combustion gas stream including the soot and forming an air curtain for preventing the sprayed soot from scattering.

10 Claims, 5 Drawing Sheets

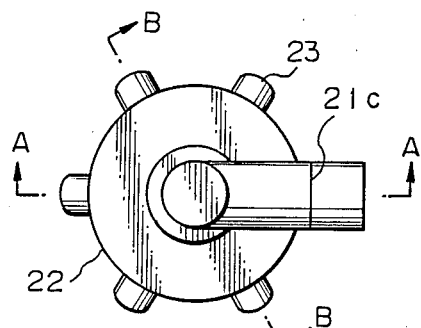
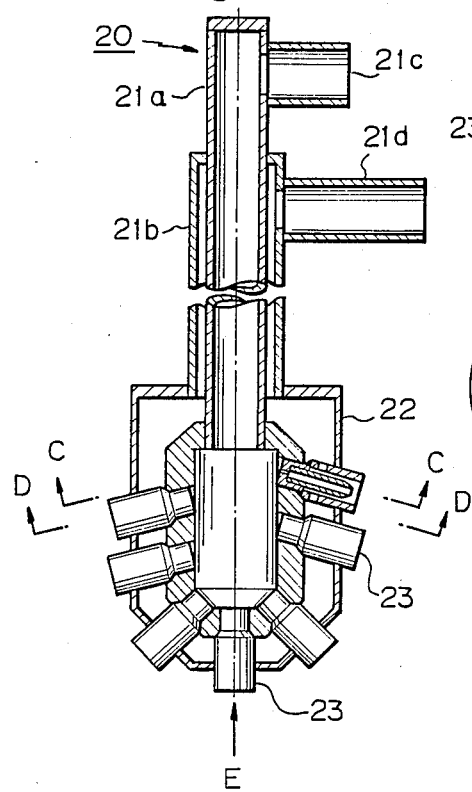
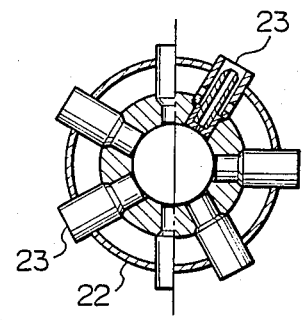
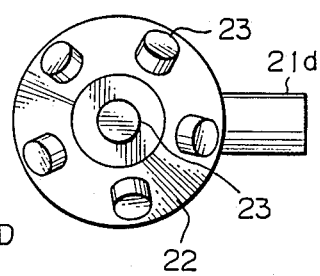

Fig. 7
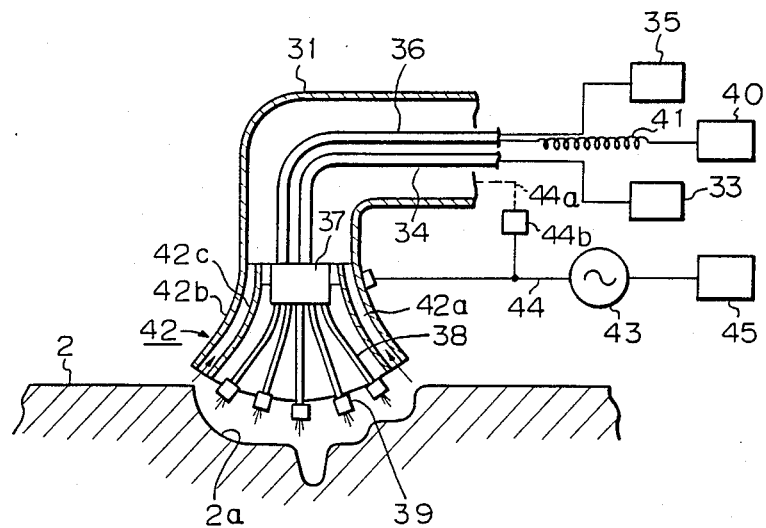
Fig. 8    Fig. 9    Fig. 10
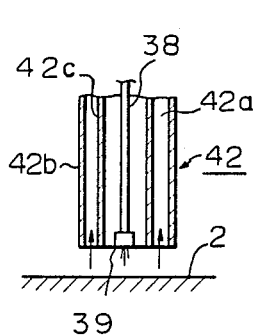 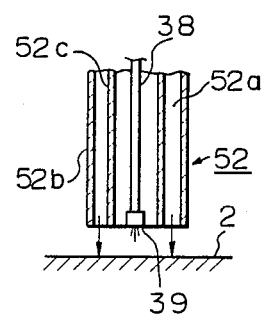 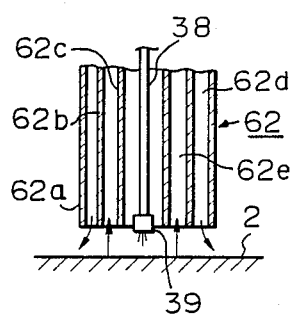

METHOD FOR COATING SOOT ON A MELT CONTACT SURFACE

BACKGROUND OF THE INVENTION

1. Field of the Invention

The present invention relates to a method for coating soot on a melt contact surface, particularly that of an injection sleeve for casting, a plunger end face or a mold cavity, to improve the flow of the melt, maintain the temperature of the melt, or improve the parting property.

2. Description of the Related Art

In various casting and forging processes such as a die casting process, a squeeze casting process, and a melt forging process, if a melt has direct contact with a melt contact surface such as the inner surface of a mold cavity or injection sleeve or a plunger end face, the parting property of a product from the mold is degraded and an advance or retreat of a plunger tip is not smooth. Accordingly, a parting agent is coated on the melt contact surface before the casting operation is carried out.

For example, water-soluble Hitasol (trademark) has been used as the parting agent. However, since the parting agent of this type is water-soluble, the temperature of the surface on which the parting agent is to be coated should be maintained at a temperature as low as about 100° to about 250° C. Furthermore, the amount deposited of the parting agent differs according to the temperature of the surface to be coated and the conditions are not stable. Moreover, in order to shorten the cycle time, water cooling becomes necessary and shortening of the cycle time is limited, and there is a problem of a long cycle time. Still in addition, since the main component of the parting agent is water-solubilized crystalline graphite, the heat conductivity is high and the temperature-maintaining property is not good, and the melt is readily cooled and running of the melt is worsened. If the concentration of the parting agent is increased so as to improve the temperature-maintaining property, the spray nozzle is readily clogged and the conditions become unstable.

Under this background, an injection method using a molding machine was proposed, in Japanese Unexamined Patent Publication No. 61-99551. According to this method, a lubricant or parting agent is coated on a melt contact surface, soot is coated thereon by a burner, a melt is supplied, and mold clamping and injection are then carried out. In this method, the temperature-maintaining property is imparted over the temperature-maintaining property attained by using only the parting agent, the time required for solidification is prolonged, and running of the melt is improved. Furthermore, an effect is attained of drastically reducing the amount of gas generated.

In this conventional injection method in a molding machine where soot is coated on a melt contact surface, however, a satisfactory result cannot be expected with respect to the adhesion of soot to the melt-contacting surface, and soot must be recoated at each shot cycle, and therefore, the productivity is reduced and a great deal of labor is required.

Further, since the space between the injection nozzle and the surface to be coated is opened, soot is scattered around to contaminate the working environment or cause an inhalation of soot by workers, and it is difficult to maintain a good working environment. This problem also arises when a ceramic powder or the like is coated as the parting agent instead of soot.

SUMMARY OF THE INVENTION

An object of the present invention is to overcome the above mentioned disadvantages involved in an injection process.

According to the present invention, there is provided a method of coating soot on a melt contact surface for use in a casting, comprising a step of charging the soot and the melt contact surface with opposite electrical polarities, to thereby cause an electrodeposition of the charged soot on the melt contact surface. A combustion gas from which the soot is derived may be produced in at least one jet stream directed onto the melt contact surface, and a circumferential air stream is produced to form an air curtain surrounding the combustion gas jet stream. The melt contact surface may be coated with a parting agent prior to the electrodeposition of the soot thereon. Preferably, the air stream is produced from the ambient air around the melt contact surface and flows in the direction opposite to that of the combustion gas jet stream toward the melt contact surface, so that the combustion gas is discharged out of the system by the air stream from the melt contact surface. Preferably, the air stream is made to flow toward the melt contact surface, and the combustion gas is forced to counter-flow away from the melt contact surface, while being surrounded by the air stream, so that the combustion gas is discharged out of the system from the melt contact surface.

A preferable voltage to be charged is 500V to 30000V. If such a charge high voltage is applied between the soot and the melt contact surface by a high voltage-generating apparatus, an attracting force is generated and the soot is tightly attracted to the melt contact surface so that even if several shot cycles are repeated, the soot is not dislodged.

Further, according to the present invention, there is provided an apparatus for coating soot on a melt contact surface for use in a casting. This apparatus comprises: jet nozzles for producing jet streams of a combustion gas including the soot; a combustion means for producing the combustion gas, and communicating conduits with the jet nozzles at one side thereof and with a starting gas source and an air feed means at the other side thereof; and an electric source for generating a high voltage to be applied between the conduits for feeding the starting gas and the melt contact surface. The apparatus may further comprise: a cylindrical outer housing open toward the melt contact surface and a cylindrical inner housing open toward the melt contact surface, the inner housing being coaxial with the outer housing to define a circumferential passage therebetween and provided with the combustion means therein and jet nozzles at the free opening end thereof; and an air suction means for pumping the ambient air around the melt contact surface through a circumferential gap space between the opening end of the outer housing and the melt contact surface into the circumferential passage.

Still further, the apparatus may comprise: three cylindrical coaxial housings open toward the melt contact surface, the inner housing being provided with the combustion means such as a burner therein and the jet nozzles at the opening end thereof and defining with the intermediate housing an inner circumferential passage therebetween, the intermediate housing defining with the outer housing an outer circumferential passage therebetween; means for producing an air stream flowing toward the melt contact surface through the outer passage, with the three housing spaced with a circumferential gap from the melt contact surface, and flowing out of the space gap; and a gas suction means for pumping the combustion gas from the melt contact surface through the inner passage.

BRIEF DESCRIPTION OF THE DRAWINGS

FIG. 2 is a plane view illustrating an injection burner for carrying out the method as shown in FIG. 1;

FIG. 3 shows, at the right thereof, a longitudinal section of the burner as shown in FIG. 2 taken along the line A—A, and at the left thereof, another longitudinal section of the burner taken along the line B—B;

FIG. 4 shows, at the right thereof, a section of the burner as shown in FIG. 3 taken along the line C—C, and at the left thereof, another section of the burner taken along the line D—D;

FIG. 5 is a perspective view of the burner, seen in the direction of arrow E in FIG. 3;

FIG. 7 is a schematic diagram showing another soot coating apparatus of the present invention, designed for coating a soot on a melt contact surface of a mold for use in a vertical mold-clamping die casting machine;

FIGS. 8 to 10 are longitudinal sectional view of various embodiments of the soot coating apparatus according to the present invention, for coating a melt contact surface of the mold.

DESCRIPTION OF THE PREFERRED EMBODIMENTS

Figure 1:
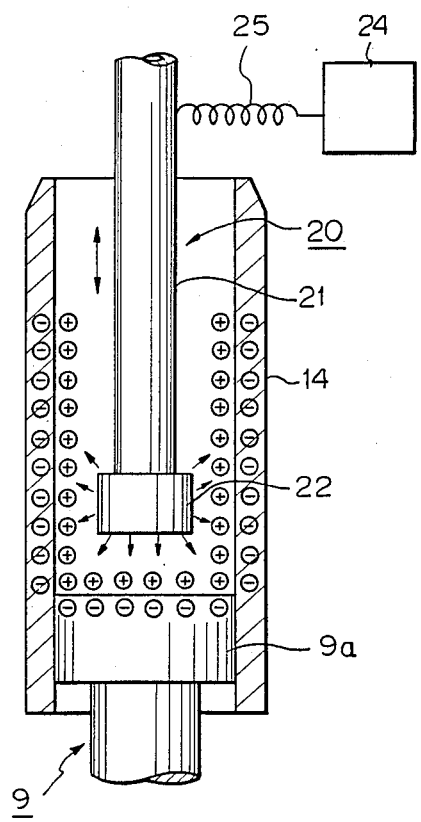
FIG. 1 is a schematic diagram illustrating a method for coating soot on a melt contact surface of an injection sleeve for casting, according to the present invention.
Figure 6:
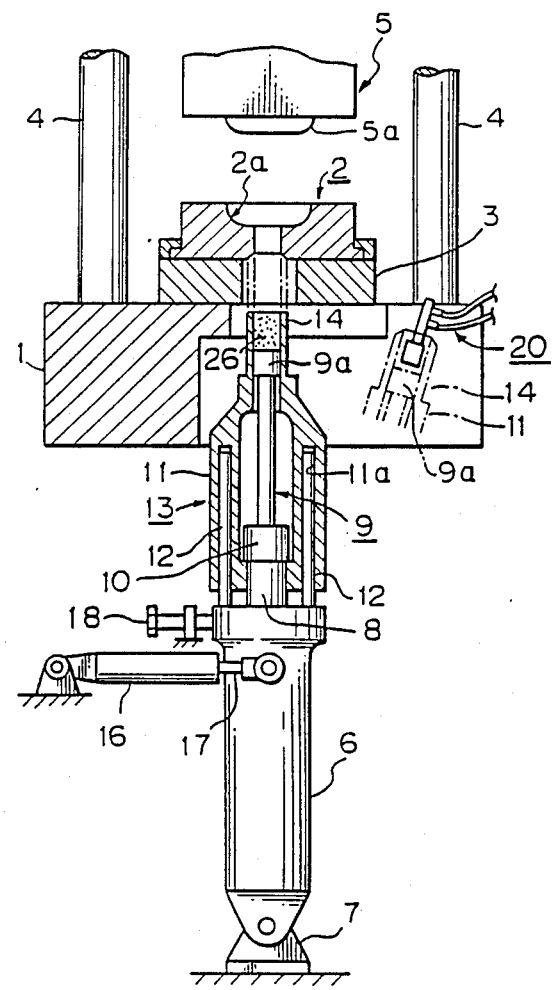
FIG. 6 is a longitudinally sectional view showing a vertical mold-clamping die casting machine incorporated with a soot coating apparatus comprising the injection burner as shown in FIGS. 2 to 5.

Referring to FIG. 6 showing a vertical mold-clamping die casting machine provided with an injection sleeve having a melt contact surface which is to be coated with soot, according to the present invention, a stationary mold 2 is attached through a bolster 3 to the top face of a stationary stand 1 secured to a floor base, and a movable stand (not shown) having a movable mold 5 attached thereto is vertically movably supported on tie rods 4 connecting the stationary stand 1 to an upper stationary stand (not shown) at four corners. The stationary mold 2 and movable mold 5 are clamped by lowering the movable stand by a mold-clamping cylinder so that a cavity is formed by a concave part 2a of the stationary mold 2 and a convex part 5a of the movable mold 5. An injection cylinder 6 is pivoted through a bracket 7 on the bottom face of a pit below the floor surface so that the injection cylinder 6 can stand vertically and be tilted. A plunger 9 having a plunger tip 9a is coaxially connected by a coupling 10 to a piston rod 8 to be advanced and retreated by the oil pressure of the injection cylinder 6. Reference numeral 11 represents a cylindrical block formed to surround the plunger 9 and coupling 10, and a mounting and dismounting cylinder 13 is formed by a pair of cylinders 11a formed on the block 11 and a ram 12 planted on the top face of the injection cylinder 6 and slidably engaged with the cylinders 11a, so that the block 11 is elevated by feeding an oil above the ram 12. A cylindrical injection sleeve 14 shown in an enlarged manner in FIG. 1 is secured to the top end of the block 11, and the plunger tip 9a is slidably fitted in an inner hole of the injection sleeve 14. When the block 11 rises, the injection cylinder 14 also rises, to a position indicated by the chain line in FIG. 6, and is engaged with a hole of the bolster 3 and connected to the stationary mold 2. Reference numeral 15 represents a melt inlet formed between this connection end and the cavity.

Reference numeral 16 represents a tilting cylinder pivoted on the base side, and an operating end or a piston rod 17 of the cylinder 16 is pivoted on the injection cylinder 6. By advancing the piston rod 17 from the state shown in the drawings, by an oil pressure while the block is dropped, the injection cylinder 6 is integrated with the block 11 and injection sleeve 14 and is tilted to a position indicated by the chain line in FIG. 6. At this tilted position, coating and pouring of a melt, described hereinafter, are carried out. Reference numeral 18 represents a stopper for regulating the injection cylinder and the like at the vertical position.

Referring to FIGS. 2 to 5, the soot-coating apparatus will now be described. A gas burner represented as a whole by reference numeral 20 in FIG. 3 has a gas pipe 21 with a double-tube structure having an inner tube 21a and an outer tube 21b, and a hydrocarbon gas such as acetylene gas is introduced to a connecting opening 21c of the inner tube 21a through a hose (not shown). This gas is a gas capable of forming soot of so-called amorphous carbon having an amorphous structure, by incomplete combustion at a low temperature, for example, about 350° C. Methane gas, alcohol gas, propane gas, and butane gas also can be used. The air is introduced into a connecting opening 21d of the outer tube 21b through a hose (not shown). A mixing chamber 22 having a double structure and communicating with both tubes 21a and 21b is formed in the top end portion of the gas pipe 21. In the inner tube, a plurality of injection nozzles 23 are arranged in three stages, each stage including a plurality of injection nozzles 23 arranged substantially equidistantly in the circumferential direction, with the arrangement phases of the respective stages in the circumferential direction being different from one another, and one injection nozzle 23 is arranged at the center, and these injection nozzle 23 are radially projected to communicate with the mixing chamber 22. The gas burner 20 having the above-mentioned structure is supported on a supporting device (not shown) so that the gas burner 20 is inserted in the inner hole of the injection sleeve 14 tilted to the position indicated by the chain line in FIG. 6, or withdrawn therefrom. The gas mixed with the air and injected from the injection nozzles 23 is ignited and the gas burner 20 is inserted into the injection sleeve 14, whereby soot is generated and caused to adhere to the inner surface of the injection sleeve 14.

Referring to FIG. 1, a high voltage-generating apparatus 24 is connected through a lead line 25 to the gas pipe 21 of the gas burner 20, and when the ignited gas burner 20 is inserted into the injection sleeve 14 and soot is generated, a charge having a high voltage is applied between the inner surface of the injection sleeve 14 and the soot, and the soot is thus attracted to the inner surface of the injection sleeve 14, whereby the adhesion of the soot is increased and a uniform adhesion of the soot is attained. The voltage is preferably 500 to 30000V, more preferably, 10000 to 20000V, and the current is several mA. In FIG. 1, the soot is positively charged and the injection sleeve 14 is earthed through other portions and kept negative.

After coating of the soot, a melt 26 is supplied into the tilted injection sleeve 14 by a melt-casting apparatus (not shown).

The method for coating soot on the melt contact surface in the die casting machine having the above-mentioned structure will now be described. After the mold clamping, the block 11 is brought down and the injection sleeve 14 is withdrawn from the bolster 3, and then the injection cylinder 6 and the like are tilted to the position indicated by the chain line in FIG. 6. At this point, the opening of the injection sleeve 14 is directed to the outside of the machine. Accordingly, the injection nozzles 23 of the gas burner 20 are ignited and the gas burner 20 is inserted into the inner hole of the injection sleeve 14, whereby the combustion gas is injected from the injection nozzles 23. Since the air is incorporated into this combustion gas in the mixing chamber 22, an appropriate speed is given to the flame according to the mixing ratio. Soot is generated by combustion of the gas and this soot is caused to adhere to the inner surface of the injection sleeve 14 and the end face of the plunger tip 9a as the melt contact surface confronted by the injection nozzles 23. The gas burner 20 is vertically moved at an appropriate speed so that the soot adheres uniformly to the melt contact surface.

When the soot is thus coated, a high voltage charge is applied between the soot and the inner surface of the injection sleeve 14 and between the soot and the end face of the plunger tip 9a, and accordingly, the soot is attracted to and adheres tightly and uniformly to these surfaces.

After the soot has been thus coated, the gas burner 20 is withdrawn and the melt 26 is supplied into the injection sleeve 14. The injection cylinder 6 and the like are raised by the tilting cylinder, and the block 11 is then elevated by the mounting and dismounting cylinder 13 to connect the injection sleeve 14 to the stationary mold 2. When the piston rod 8 of the injection cylinder 6 is elevated by the oil pressure, since the plunger tip 9a rises in the injection sleeve 14, the melt 26 is injected into the cavity through the melt inlet 15. After the injected melt 26 is solidified, the mold is opened and the product is withdrawn.

In this injection operation, by coating soot instead of a water-soluble parting agent, even if the temperature of the surface to be coated is as high as about 400° C., the soot adheres to the surface in a good condition while showing a good parting effect, and since the heat conductivity of the soot is very low and about 1/100 of the heat conductivity of the parting agent, the temperature-maintaining property is very good. Furthermore, the generation of gas is controlled. According to this method, since a high voltage charge is applied between the soot and the surface to be coated while the soot is generated, the adhesion of the soot is greatly increased and the temperature-maintaining effect is maintained for a long time.

In the above-mentioned example, soot is stuck directly to the melt contact surface of the injection sleeve. However, a modification may be adopted in which a lubricant or parting agent is first coated on the melt contact surface and soot is then coated thereon.

In the present invention, when soot is coated on the inner surface of the injection sleeve by using the burner apparatus, a method may be adopted in which, while the burner apparatus is rotated with the axial line thereof as the center and the burner apparatus is moved in the direction of the axial line, soot is coated, whereby all of the melt contact surface, such as the inner surface of the injection sleeve, can be uniformly coated with soot.

Furthermore, in the invention, if desired, a method may be adopted in which the magnitude of the charge to be applied between soot and the melt contact surface is changed according to the vertical and lateral positions of the injection sleeve or the mold cavity, whereby the degree of coating of the soot is appropriately changed to appropriately change the thickness of the soot coating. Moreover, when soot is coated while the burner apparatus is moved, a method may be adopted in which the magnitude of the charge to be applied between the soot and the melt contact surface is changed with the lapse of time by using a timer or detecting the moving position of the burner apparatus by a pulse or limit switch and utilizing electric signals therefrom, and using a voltage-changing apparatus, whereby the coating thickness is appropriately changed as desired.

Note, if a ceramic is flame-injected to the inner surface of the injection sleeve 14, the electric resistance is increased, a flow of the electric current becomes difficult, and the cut-off of electricity is delayed, with the result that the charging time is prolonged and the soot adheres in a porous impregnation state, and the adhesion of the soot is increased and the adhering effect is enhanced. Namely, a sprayless mold or sprayless sleeve can be provided, and soot can be sprayed only once per several shot cycles.

Figure 11:
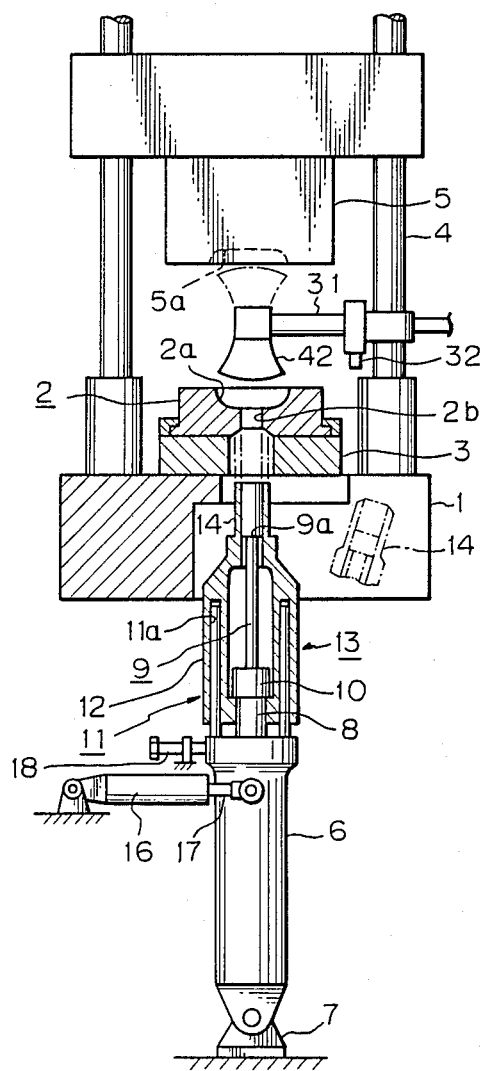
FIG. 11 is a longitudinally sectional view corresponding to that of FIG. 6, showing another vertical mold-clamping die casting machine incorporated with another soot coating apparatus for coating a soot on a melt contact surface of a mold.

FIG. 11 shows another vertical die casting machine, wherein substantially the same elements or members as those of the apparatus as shown in FIG. 6 are denoted by the same numerals.

This machine is provided with a soot-coating apparatus as shown in FIG. 7 for coating soot on the lower and upper inner surfaces of the mold cavity as the melt contact surfaces.

Referring to FIGS. 7 and 11, a soot-coating apparatus for coating soot on the lower and upper inner surfaces of the mold cavity 2a and 5a as the melt contact surfaces is arranged in the die casting machine having the above-mentioned structure. A hollow arm 31 supported on one of the tie rods 4 is rotatable in the horizontal direction, and the arm 31 is driven and swung by a cylinder (not shown) so that the top end of the arm 31 is selectively exposed to the outside of the machine or moved between opened mold halves 2 and 5. The arm 31 or a shaft piercing through a hollow portion thereof is rotatably supported, and the arm 31 is driven by an oil pressure motor 32 arranged on the base portion of the arm 31 so that the arm 31 is turned by 180° in the normal and reverse directions. The top end portion of the hollow arm 31 is bent in an L-shape. An air tube 34 connected to an air source 33 and a gas tube 36 connected to a gas bomb 35 are arranged in the arm 32 through the hollow portion thereof. A hydrocarbon gas such as acetylene gas is stored in the gas bomb 35. This gas forms, as soot, so-called amorphous carbon having an amorphous structure, by incomplete combustion at a low temperature, for example, about 700° C. Methane gas, alcohol gas, propane gas, and butane gas also can be used. Reference numeral 37 represents a mixer attached to the top end of the arm 31. The air tube 34 and gas tube 36 are connected to the mixer 37 so that the air and gas are mixed, and a plurality of bendable copper pipes 38 are attached to the mixer 37, and a nozzle 39 is attached to the top end of each copper pipe 38. When this nozzle 39 is ignited while confronting the cavity of the mold (2, 5), combustion gas is injected under air pressure and soot formed by a combustion is coated on the cavity halves 2a, 5a. A high voltage-generating apparatus 40 is connected to the gas tube 36 through a lead top end 41, so that a charge having a high voltage is applied to the inner surface of the cavity half 2a during the soot-coating operation and soot is attracted to the inner surface of the cavity to increase the adhesion of the soot and uniformalize this adhesion of the soot. The voltage is preferably 500 to 30000V, more preferably 10000 to 20000V, and the current is several mA.

In this apparatus, the outer portions of the mixer 37, copper pipes 38 and nozzle 39 are covered with a cylindrical hood 42 expanded toward the lower end, and the hood 42 has a double structure which includes an outer tube 42b and an inner tube 42c so that an air passage 42a opened to the lower end is formed. A suction air source 43 is connected to the hood 42 through a pipe 44, and a dust precipitator 45 is connected to the suction air source 43. In this structure, during the soot-coating operation, if the suction air source is operated, the outer air is sucked from the lower open end of the air passage 42a and an annular air curtain is formed between this open end and the soot-coated surface to prevent a scattering of the soot. The dust or soot drawn up together with the outer air is collected in the dust precipitator 45.

A spraying apparatus for spraying a parting agent on a mold cavity, developed by the present inventors and disclosed in Japanese Examined Patent Publication No. 60-20113, is attached to this die casting machine, although this spraying machine is not shown in the drawings. This mold spraying apparatus comprises an arm rotatably supported by the tie rod 4, as in the above-mentioned soot-coating apparatus, and a supply tube for supplying a parting agent as a powder and an air tube for supplying the air are connected to a spray head attached to the top end of the arm. A double-structure hood similar to the above-mentioned hood 42 is arranged to cover the periphery of the spray head. In this structure, if the air source is started while the spray head is located between the molds 2 and 5, the parting agent is injected from the nozzle and coated on the inner surface of the cavity halves 2a, 5a, and scattering of the parting agent is prevented by an air curtain formed by the suction air from the hood.

In the present example, the soot-coating apparatus is disposed independently from the parting agent-coating apparatus. It will be obvious, however, that the air tube 34, gas tube 36 and nozzles 39 of the soot-coating apparatus shown in FIG. 7 can be built in the above-mentioned spray head.

The operation of the die casting machine having the above-mentioned structure will now be described. After one cycle is completed, the mold is opened, as shown in FIG. 8, a product is withdrawn from the machine, and the preparation for the next casting is made. Namely, the arm of the mold spraying apparatus (not shown) is turned to cause the spray head on the top end to confront the cavity 2a of the stationary mold 2, and when the air source is operated, the parting agent is coated on the inner surface of the cavity half 2a of the stationary mold half 2. The arm is turned by 180° by a motor and the spray head is caused to confront the movable mold half 5, and when the air source is operated, the parting agent is coated on the inner surface of the cavity half 5a of the movable mold half 5. After the parting agent has been thus coated, the spray head of the mold spraying apparatus is moved away from the machine, and the arm 31 of the soot-coating apparatus is turned to cause the nozzle 39 to confront the inner surface of the cavity half 2a of the stationary mold half 2. When the gas bomb 35 is opened, the air source 33 is operated, and the nozzle 39 is ignited, whereby soot is coated on the inner surface of the cavity half. At the coating step, since a high voltage charge generated by the high voltage-generating apparatus is applied between the soot and the inner surface of the cavity half 2a, the soot is attracted to the surface to be coated and is coated tightly and uniformly thereon. Subsequently, the arm 31 is turned by 180° by the motor 32 to cause the nozzle 39 to confront the other cavity half 5a of the movable mold half 5, and the soot is coated on the inner surface of the cavity half 5a of the movable mold half 5 as in the case of the stationary mold half 2.

In this operation of coating the parting agent and soot, when the suction air source 43 connected to the hood 42 is started, the outer air is drawn from the open lower end of the air passage 42a and an annular air curtain is formed between this open end and the surface to be coated, to prevent a scattering of the parting agent or soot. Accordingly, the workers do not inhale the powder of the parting agent or soot.

As described above, if an annular air curtain is thus formed between the open end of the air passage 42a and the surface to be coated with soot, it is possible to prevent a scattering of the soot, but within the hood 42, the peripheral portion of the copper pipe 38 and the space between the copper pipe 39 and the soot-coated surface of the cavity half 2a are filled with the soot. Accordingly, after completion of the soot-coating operation, if the arm 31 or hood 42 is raised, this soot could be discharged outside the hood 42 to worsen working environment. Accordingly, to avoid this disadvantage, preferably, just before the arm 31 is separated from the inner surface of the cavity half 2a after completion of the soot-coating operation, a vacuum suction is effected from the inside of the arm 31 to remove excess soot retained in the air in the hood 42. In FIG. 7, reference numeral 44a represents a pipe for effecting a vacuum suction in the hood 42 through the arm 31, and a change valve or a valve for a relatively weak vacuum suction may be arranged in this pipe 44a.

After the parting agent and soot have been thus coated, a melt is supplied into the injection sleeve 14, and the injection cylinder 6 and the like are raised by the tilting cylinder 16, and then the block 13 is raised by the cylinder 11a to connect the injection cylinder 6 to the stationary mold half 2. When the piston rod 8 of the injection cylinder 6 is raised by an oil pressure, the plunger tip 9a rises in the injection sleeve 14, and therefore, the melt is injected into the cavity half (2a, 5a) through the melt inlet 2b. Then, after the melt is solidified, the mold is opened and the product is withdrawn.

In the present example, a plurality of stationary nozzles 39 are arranged to coat soot and the like on the entire surface of the cavity. However, a modification may be adopted in which one copper pipe 38 and one nozzle 39 are arranged, as shown in FIG. 8 illustrating the longitudinal section of the main part of the apparatus of the present invention, and soot and the like are coated while moving the nozzle 39 together with the hood 32 along the cavity half of the mold half 2. In the example shown in FIGS. 7 and 8, the suction air source 43 is connected to the air passage 42a for the formation of an air curtain. Alternatively, an air curtain may be formed by a blow air source connected to an air passage 52a defined by outer and inner tubes 52b and 52c of a hood 52, as shown in FIG. 9. Moreover, a method may be adopted in which a hood 62 has a three-tube structure including an outer tube 62a, a middle tube 62b, an inner tube 62c, and air passages 62d and 62e, and these air passages are connected to a blow air source and a suction air source, respectively, for a formation of an air curtain, as shown in FIG. 10. The examples shown in FIGS. 9 and 10 can be applied to the stationary apparatus shown in FIG. 7. If an electrostatic spray gun is used as the spray head of the parting agent-spraying apparatus or soot-coating apparatus, adhesion of the parting agent or soot is further ensured.

Briefly, according to the method of the present invention for coating soot on a melt contact surface, a combustion gas is injected on the melt contact surface from an injection nozzle to generate soot, and a high voltage charge is applied between the soot and the melt contact surface. By adopting this method, the temperature-maintaining property is improved and generation of gas is controlled, compared with the case where the conventional parting agent is used. Furthermore, since the soot is charged and stuck to the surface to be coated, the adhesion of the soot is greatly increased and is maintained for a long time. Accordingly, the frequency of coating of the soot is reduced, the productivity is increased, and labor can be saved.

According to the above disclosed apparatus of the present invention, a hood covering the periphery of a soot-coating nozzle for injecting the soot has a multiple structure having at least one of a blow air passage opened to the surface to be coated and a suction air passage. If this structure is adopted, at the soot-coating operation, an annular air curtain is formed between an air passage around an injection nozzle and the surface to be coated, the sprayed soot is intersected and scattering thereof is prevented and accordingly, an improvement the working environment is realized.

We claim:

1. A method of coating soot, employing a gas burning system, on a melt contact surface for use in a casting, comprising: the step of charging the soot and the melt contact surface with opposite electrical polarities to thereby cause an electrodeposition of the charged soot on the melt contact surface;
   wherein a combustion gas from which the soot is derived is produced in at least one jet stream directed onto the melt contact surface; and
   the melt contact surface is coated with a parting agent prior to being subjected to said electrodeposition of the soot.

2. A method of coating soot according to claim 1, wherein a circumferential air stream is produced to form an air curtain surrounding said combustion gas set stream.

3. A method of coating soot according to claim 2, wherein said circumferential air stream is produced from the ambient air around the melt contact surface and flows in the direction opposite to that of said combustion gas jet stream toward the melt contact surface, so that combustion gas is discharged out of the gas burning system by said air stream from said melt contact surface.

4. A method of coating soot according to claim 2, wherein said circumferential air stream is produced to flow toward the melt contact surface, and the combustion gas is forced to counter-flow away from the melt contact surface, while being surrounded by said circumferential air stream, so that said combustion gas is discharged out of said gas burning system from the melt contact surface.

5. A method of coating soot on a melt contact surface of a casting apparatus adapted for multiple cycles of injection molding, comprising:
   the step of coating soot on the melt contact surface by applying a high voltage between the soot and the melt contact surface to thereby cause an electrodeposition of the soot on the melt contact surface, wherein said step of coating is carried out once in a plurality of injection molding cycles.

6. The method of claim 5, wherein a combustion gas from which the soot is derived is produced in at least one jet stream directed onto the melt contact surface.

7. The method of claim 5, wherein said coating step includes applying a voltage between 500 to 30,000V between the soot and the melt contact surface.

8. The method of claim 5, wherein said coating step includes varying the voltage applied between the soot and the melt contact surface to control the thickness of the soot coating.

9. A method of coating soot on a melt contact surface of a casting apparatus adapted for multiple cycles of injection molding, comprising:
   a first step of coating the melt contact surface with a parting agent; and
   a second step of charging both soot derived from a combustion gas produced in at least one jet stream directed onto the melt contact surface and the melt contact surface to thereby cause an electrodeposition of the charged soot on the surface covered by the parting agent.

10. The method of claim 9, wherein a circumferential air stream is produced to form an air curtain surrounding said combustion gas jet stream.

* * * * *